J. A. FANGER, DEC'D.
M. A. FANGER, ADMINISTRATRIX.
BEET CONVEYING MECHANISM.
APPLICATION FILED APR. 12, 1917. RENEWED JAN. 4, 1918.
1,282,205.
Patented Oct. 22, 1918.
2 SHEETS—SHEET 2.
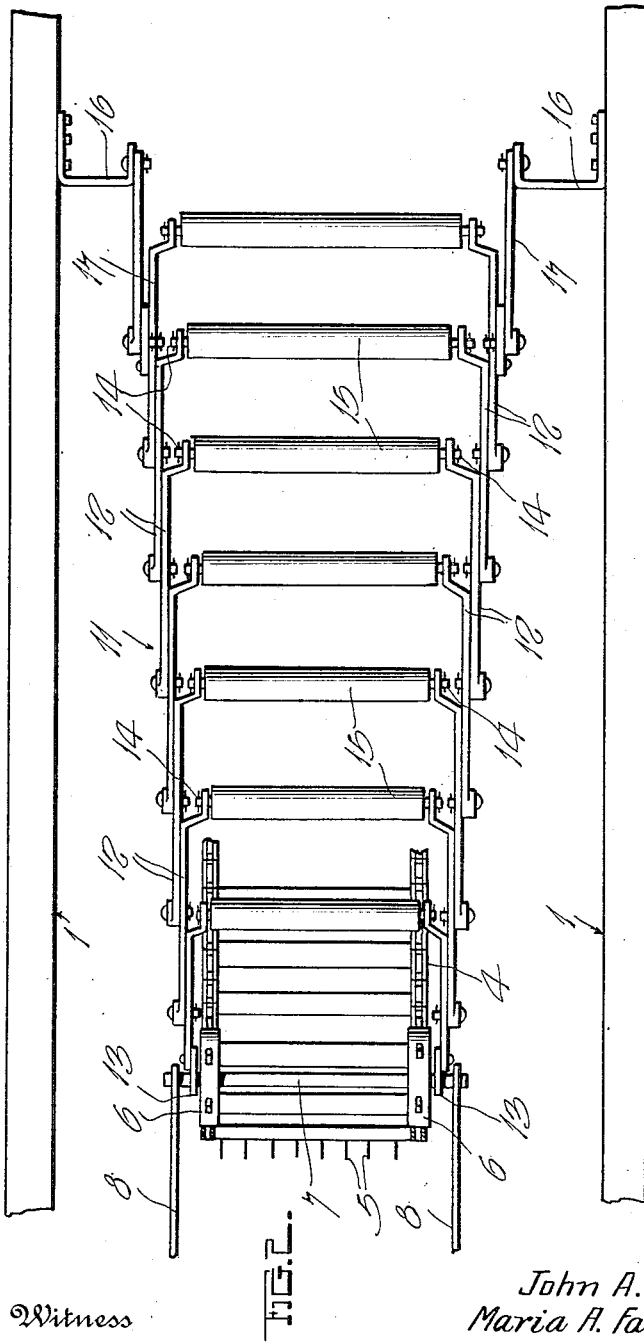
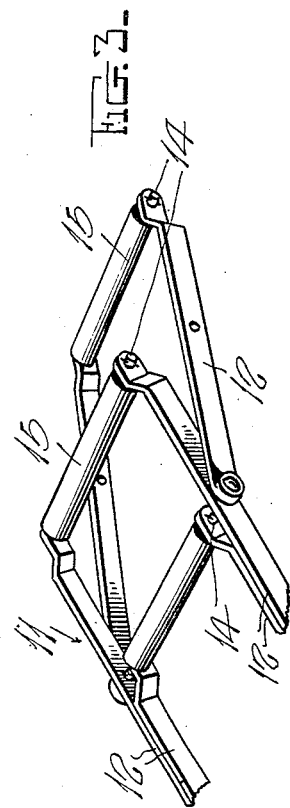
Inventor
John A. Fanger, Deceased
Maria A. Fanger, Administratrix
Witness
H. Woodard

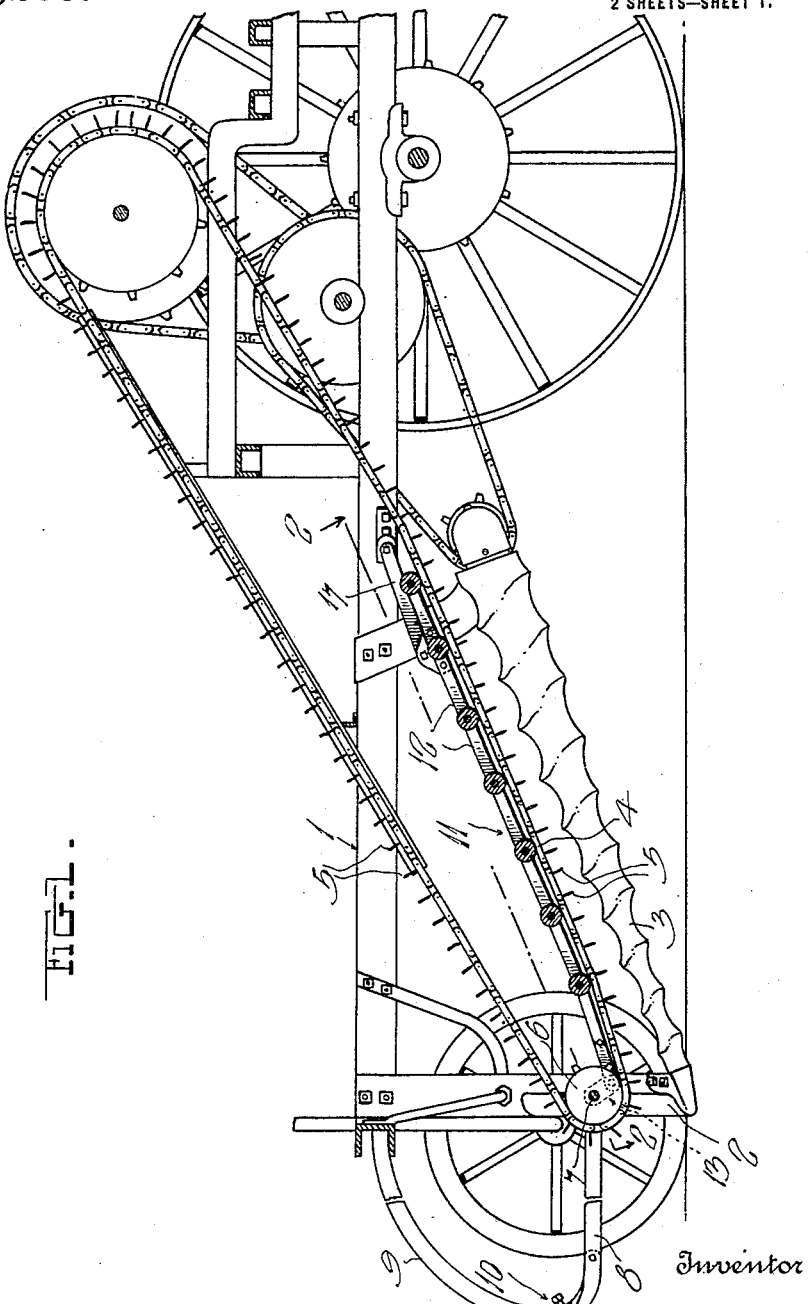

UNITED STATES PATENT OFFICE.

JOHN A. FANGER, DECEASED, LATE OF KALIDA, OHIO, BY MARIA ANNA FANGER, ADMINISTRATRIX, OF KALIDA, OHIO, ASSIGNOR TO THE FANGER BEET HARVESTER CO., OF TOLEDO, OHIO, A CORPORATION OF OHIO.

BEET-CONVEYING MECHANISM.

1,282,205. Specification of Letters Patent. Patented Oct. 22, 1918.

Application filed April 12, 1917, Serial No. 161,515. Renewed January 4, 1918. Serial No. 210,407.

*To all whom it may concern:*

Be it known that JOHN A. FANGER, deceased, late a citizen of the United States, and resident of Kalida, in the county of Lucas, State of Ohio, invented new and useful Improvements in Beet-Conveying Mechanisms; and that MARIA ANNA FANGER, the duly constituted administratrix of the estate of JOHN A. FANGER, deceased, does hereby declare the following to be a full, clear, and exact description of the said invention of said decedent, JOHN A. FANGER, and such as will enable others skilled in the art to which it appertains to make and use the same.

This application is drawn around structure very similar to that eliminated from the application which terminated favorably in U. S. Patent #1210057, issued December 26, 1916, the present application being drawn more particularly around the weighted chain employed for holding the endless pronged belt in proper engagement with the tops of the beets as they are carried upwardly and rearwardly by the two augers.

In the accompanying drawings which constitute a part of this specification, and in which similar reference characters designate corresponding parts throughout the several views, Figure 1 is a longitudinal section of a beet harvesting machine showing the application of the weighted chain, numerous parts being eliminated for the sake of clearness;

Fig. 2 is a horizontal section on substantially the plane of the line 2—2 of Fig. 1; and Fig. 3 is a perspective view of a portion of the chain.

In the drawings above briefly described, the numeral 1 has reference to a portable wheel-supported frame from the front end of which two earth-slitting blades 2 depend, said blades rotatably supporting the front ends of a pair of augers 3 which are designed to remove the beets from the earth and convey them rearwardly to a suitable topping mechanism not shown. An endless belt 4 is located above the augers 3 and coöperates therewith in carrying the beets rearwardly, said belt having prongs 5 for engagement with said beets. The belt 4 may be mounted in any preferred manner but is shown passing around sprockets 6 on a transverse shaft 7 at the front of the machine, said shaft being supported by arms 8 which extend rearwardly from hanger bars 9 secured rigidly to the frame 1, any preferred means 10 being provided for swinging the rear ends of the arms 8 vertically to space belt 4 a greater or less distance from the augers 3.

A weighted chain 11 overlies the lower reach of belt 4 to insure proper engagement of its prongs 5 with the beets and it is the construction and arrangement of this chain which constitutes the gist of the present invention. The chain in question includes two side chains, each of which is formed of a plurality of links 12, the front ends of all links, with the exception of those at the extreme front end of the chain, being pivoted to the adjacent links between the ends of the latter, said ends of the links at the front end of the chain being suspended by hangers 13 from the shaft 7 or from any other suitable part of the machine. Rods 14 extend between the rear ends of the links 12 and support heavy transverse rollers 15 which rest on the belt 4. The rear end of the chain 11 may be mounted in any preferred manner but it is preferable to connect the same with arms 16 extending inwardly from the frame 1, by means of links 17.

By constructing and mounting the chain 11 in the manner shown and described, it constitutes a flexible weight which may move freely in vertical directions with the lower reach of the belt 4 to always insure that said belt properly engages the beets. On account of the advantages derived by the specific construction described, this arrangement constitutes the preferred form of the device but it is to be understood that within the scope of the invention as claimed, numerous changes may be made without sacrificing the principal advantages.

I claim:

1. In a beet harvesting machine, the combination of beet conveying means, an endless belt above and coöperating with said conveying means, and a flexible weight resting on the lower reach of said belt and extending longitudinally thereof to insure proper engagement of said reach with the beets.

2. In a beet harvesting machine, the combination of beet conveying means, an endless belt above and coöperating with said conveying means, and a weighted chain resting on the lower reach of said belt to insure proper engagement thereof with the beets.

3. In a beet harvesting machine, the combination of beet conveying means, an endless belt above and coöperating with said conveying means, and a chain composed of a plurality of connected independently movable links and transverse rollers carried by said links and resting on the lower reach of said belt to insure proper engagement thereof with the beets.

In testimony whereof, I, MARIA ANNA FANGER, administratrix of the estate of JOHN A. FANGER, have hereunto set my hand in the presence of two subscribing witnesses.

MARIA ANNA FANGER,
*Administratrix of John A. Fanger, deceased.*

Witnesses:
 ANNA BENSMAN,
 I. F. STAUFFER.

Copies of this patent may be obtained for five cents each, by addressing the "Commissioner of Patents, Washington, D. C."